(12) United States Patent
Koyama (10) Patent No.: US 12,545,032 B2
(45) Date of Patent: Feb. 10, 2026

(54) INKJET RECORDING APPARATUS

(71) Applicant: KYOCERA Document Solutions Inc., Osaka (JP)

(72) Inventor: Akinori Koyama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 217 days.

(21) Appl. No.: 18/495,317

(22) Filed: Oct. 26, 2023

(65) Prior Publication Data

US 2024/0140105 A1    May 2, 2024

(30) Foreign Application Priority Data

Oct. 27, 2022 (JP) ................. 2022-172269

(51) Int. Cl.

| | | |
|---|---|---|
| B41J 2/21 | (2006.01) | |
| B41J 2/15 | (2006.01) | |
| B41J 2/155 | (2006.01) | |
| C09D 11/033 | (2014.01) | |
| C09D 11/037 | (2014.01) | |
| C09D 11/322 | (2014.01) | |
| C09D 11/324 | (2014.01) | |
| C09D 11/40 | (2014.01) | |

(52) U.S. Cl.
CPC ............ *B41J 2/2107* (2013.01); *B41J 2/155* (2013.01); *C09D 11/033* (2013.01); *C09D 11/037* (2013.01); *C09D 11/322* (2013.01); *C09D 11/324* (2013.01); *C09D 11/40* (2013.01)

(58) Field of Classification Search
CPC ....... B41J 2/2107; B41J 2/155; C09D 11/033; C09D 11/037322; C09D 11/324; C09D 11/40
See application file for complete search history.

(56) References Cited

U.S. PATENT DOCUMENTS

2015/0328900 A1* 11/2015 Kitada ................. C09D 11/101
                                                                    347/21

FOREIGN PATENT DOCUMENTS

| JP | 2014-065826 A | | 4/2014 |
|---|---|---|---|
| JP | 2018069652 A | * | 5/2018 |

* cited by examiner

*Primary Examiner* — Jason S Uhlenhake
(74) *Attorney, Agent, or Firm* — Studebaker Brackett PLLC (57) ABSTRACT

An inkjet recording apparatus includes two or more line recording heads and inks each accommodated in a corresponding one of the line recording heads. The line recording heads perform ink ejection onto a recording medium in a specific order at a regular ejection interval T. The ejection interval T is at least 300 milliseconds and no greater than 530 milliseconds. The line recording heads include at least a first line recording head that performs ink ejection onto the recording medium first and a second line recording medium that performs ink ejection onto the recording medium next to the first line recording head. Each of the inks contains a pigment, a water-soluble organic solvent, and water. The water-soluble organic solvent includes a glycol ether compound.

4 Claims, 1 Drawing Sheet

INKJET RECORDING APPARATUS

INCORPORATION BY REFERENCE

The present application claims priority under 35 U.S.C. § 119 to Japanese Patent Application No. 2022-172269, filed on Oct. 27, 2022. The contents of this application are incorporated herein by reference in their entirety.

BACKGROUND

The present disclosure relates to an inkjet recording apparatus.

Recent rapid advances in inkjet recording apparatuses have made it possible when using photographic paper to achieve high-definition image quality comparable to silver-halide photography. The inkjet recording apparatuses are required to inhibit, in formation of color images with a plurality of inks, occurrence of ink blotting (especially, ink blotting caused by ejection of inks of different colors onto two adjacent areas of a recording medium) in addition to having excellent ejection stability. Inhibition of occurrence of ink blotting is important particularly when using a hardly absorbent recording medium such as coated paper.

As an example of methods for inhibiting occurrence of ink blotting in inkjet recording apparatuses, there is proposed an inkjet recording apparatus using a first ink and a second ink. The first ink contains a coloring material, a reactive compound having two or more reactive functional groups in one molecular, a water-soluble solvent, and/or water. The second ink contains a reactive compound having a reactive functional group, a water-soluble solvent, and/or water.

SUMMARY

An inkjet recording apparatus according to an aspect of the present disclosure includes two or more line recording heads and inks each accommodated in a corresponding one of the line recording heads. The line recording heads perform ink ejection onto a recording medium in a specific order at a regular ejection interval T. The ejection interval T is at least 300 milliseconds and no greater than 530 milliseconds. The line recording heads include at least a first line recording head that performs ink ejection onto the recording medium first and a second line recording head that performs ink ejection onto the recording medium next to the first line recording head. Each of the inks contains a pigment, a water-soluble organic solvent, and water. The water-soluble organic solvent includes a glycol ether compound. Each of the inks has a dynamic surface tension at a surface age of 10 milliseconds of at least 40.0 mN/m. Where one of the inks that is accommodated in the first line recording head is a first ink and another one of the inks that is accommodated in the second line recording head is a second ink, a difference between a dynamic surface tension of the first ink at a time when the ejection interval T has elapsed from ejection of the first ink onto the recording medium and a dynamic surface tension of the second ink at a surface age of 10 milliseconds is no greater than 3.0 mN/m.

DETAILED DESCRIPTION

Figure 1:
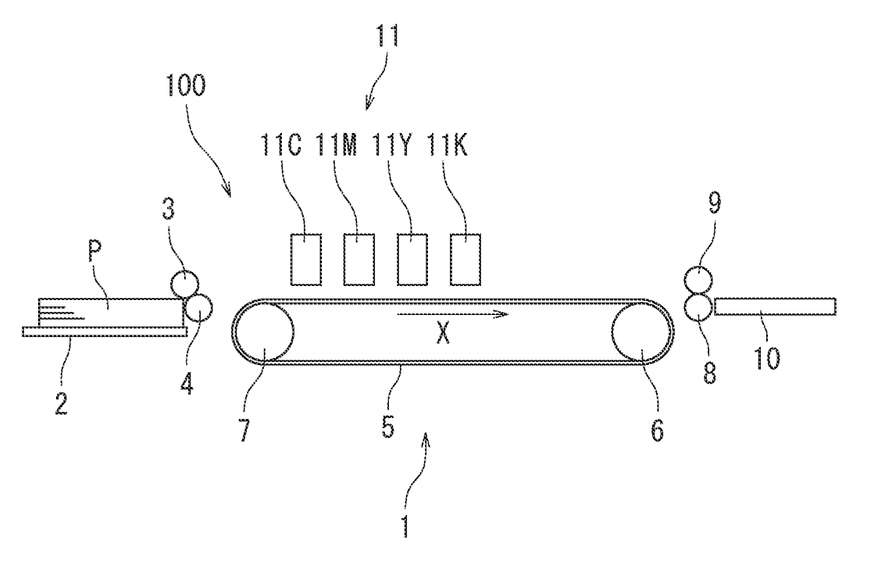
FIGURE is a diagram illustrating main components of an inkjet recording apparatus according to the present disclosure.

The following describes embodiments of the present disclosure. Note that values for dynamic surface tension of an ink are values as measured by the maximum bubble pressure method at 25° C. The dynamic surface tension is measured herein by a method described in detail in Examples or a method in compliance therewith.

In the present specification, the term "(meth)acryl" is used as a generic term for both acryl and methacryl.

First Embodiment: Inkjet Recording Apparatus

An inkjet recording apparatus according to a first embodiment of the present disclosure includes two or more line recording heads and inks each accommodated in a corresponding one of the line recording heads. The line recording heads perform ink ejection (by inkjet) onto a recording medium in a specific order at a regular ejection interval T. The ejection interval T is at least 300 milliseconds and no greater than 530 milliseconds. The line recording heads include at least a first recording head that performs ink ejection onto the recording medium first and a second recording head that performs ink ejection onto the recording medium next to the first line recording head. Each of the inks contains a pigment, a water-soluble organic solvent, and water. The water-soluble organic solvent includes a glycol ether compound. Each of the inks has a dynamic surface tension at a surface age of 10 milliseconds of at least 40.0 mN/m. Where one of the inks that is accommodated in the first line recording head is a first ink and another one of the inks that is accommodated in the second line recording head is a second ink, a difference between the dynamic surface tension of the first ink at a time when the ejection interval T has elapsed from ejection of the first ink onto the recording medium (i.e., from formation of an interface between the recording medium and the first ink) and the dynamic surface tension of the second ink at a surface age of 10 milliseconds is no greater than 3.0 mN/m.

Examples of the recording medium used in the inkjet recording apparatus of the present disclosure include recording mediums made from paper, resin, metal, glass, or ceramics. The recording medium is preferably a hardly absorbent recording medium such as coated paper or matte paper. The inkjet recording apparatus of the present disclosure can inhibit occurrence of ink blotting even in formation of color images with a plurality of inks on a hardly absorbent recording medium in which ink blotting (especially, ink blotting caused in ejection of inks of mutually different colors onto two adjacent area of a recording medium) is likely to occur. In the following, ink blotting in formation of color images with a plurality of inks such as above may be also referred to simply as "blotting".

The inkjet recording apparatus of the present disclosure includes two or more line recording heads. The line recording heads are arranged at a substantially regular interval in parallel to a conveyance direction of the recording medium, for example. The number of the line recording heads included in the inkjet recording apparatus of the present disclosure is preferably at least 2 and no greater than 6, and more preferably 4. As a result of including four line recording heads, the inkjet recording apparatus of the present disclosure can perform ejection of a cyan ink, a magenta ink, a yellow ink, and a black ink, which are necessary for general color printing, using the respective line recording heads.

In the following, a first line recording head is a line recording head that performs ink ejection onto the recording medium first among the line recording heads included in the inkjet recording apparatus of the present disclosure. Also, a second line recording head is a line recording head that performs ink ejection onto the recording medium next to the first line recording head.

When the number of the line recording heads included in the inkjet recording apparatus of the present disclosure is 3 or more, a third line recording head is a line recording head that performs ink ejection onto the recording medium next to the second line recording head. When the number of the line recording heads included in the inkjet recording apparatus of the present disclosure is 4 or more, a fourth line recording head is a line recording head that performs ink ejection onto the recording medium next to the third line recording head. As such, the same as above applies to the name of each line recording head when the number of the line recording heads included in the inkjet recording apparatus of the present disclosure is 5 or more. When the number of the line recording heads included in the inkjet recording apparatus of the present disclosure is n (n: any natural number of at least 5), an n-th line recording head is a line recording head that performs ink ejection onto the recording medium next to a (n−1)-th line recording head. That is, in the present disclosure, when the number of the line recording heads included in the inkjet recording apparatus is z (z: any natural number of at least 2), a z-th line recording head is a line recording head that performs ink ejection onto the recording medium next to a (z−1)-th line recording head.

Of the inks, an ink accommodated in the first line recording head is a first ink and an ink accommodated in the second recording head is a second ink. When the inkjet recording apparatus of the present disclosure includes the third line recording head, the ink accommodated in the third line recording head is a third ink. When the inkjet recording apparatus of the present disclosure includes the fourth line recording head, the ink accommodated in the fourth line recording head is a fourth ink. The same as above applies to the name of each ink when the number of the line recording heads included in the inkjet recording apparatus of the present disclosure is 5 or more. In the present disclosure, when the inkjet recording apparatus of the present disclosure includes the n-th line recording head, the ink accommodated in the n-th line recording head is an n-th ink. That is, when the inkjet recording apparatus of the present disclosure includes the z-th line recording head, the ink accommodated in the z-th line recording head is a z-th ink.

As a result of having the above features, the inkjet recording apparatus of the present disclosure can have excellent ink ejection stability and can inhibit occurrence of blotting. The reasons thereof are inferred as follows. Note that the following describes as an example a case in which an image (first image) is formed at a specific location of a recording medium with the first ink and then an image (second image) is formed at a location adjacent to the first image with the second ink, using the inkjet recording apparatus of the present disclosure.

The inkjet recording apparatus of the present disclosure is set to eject the inks at an ejection interval T of at least 300 milliseconds and no greater than 530 milliseconds. The ejection interval T is determined (inter-head distance/printing speed) by dividing an inter-head distance of the line recording heads by a printing speed (usually, a recording medium conveyance speed). The inkjet recording apparatus of the present disclosure is set to eject the inks at a relatively long ejection interval T (at least 300 milliseconds). Therefore, there is a relatively long time interval between ejection of the first ink by the first line recording head and ejection of the second ink by the second recording head. As such, the first ink contained in the first image has dried to some extent by the time the second image is formed. As a result, the inkjet recording apparatus of the present disclosure can inhibit mixing of the first ink contained in the first image and the second ink contained in the second image to some extent in formation of the first image and the second image adjacent to each other on the recording medium.

However, it is necessary to extremely enlarge the apparatus for increasing the inter-head distance or extremely decrease the printing speed in order to extremely elongate the ejection interval T, which leads to a lack of practicality. Therefore, the ejection interval T of the inkjet recording apparatus of the present disclosure is set to no greater than 530 milliseconds in view of practicality.

In the inkjet recording apparatus of the present disclosure, a difference (also referred to below as a difference $\Delta$) between the dynamic surface tension (also referred to below as $\gamma_T$) of the first ink at the time when the ejection interval T has elapsed from ejection of the first ink onto the recording medium (i.e., from formation of an interface between the recording medium and the first ink) and the dynamic surface tension (also referred to below as $\gamma_{10}$) of the second ink at a surface age of 10 milliseconds is no greater than 3.0 mN/m. The difference $\Delta$ between the dynamic surface tensions corresponds to a difference at the time when the second image is formed between the dynamic surface tension of the first ink contained in the first image and the dynamic surface tension of the second ink that is ejected newly. That is, the dynamic surface tension of the first ink at the time when the second image is formed is $\gamma_T$ because the ejection interval T has elapsed from ejection of the first ink (the ejection interval T has elapsed from formation of an interface between the recording medium and the first ink). Also, the dynamic surface tension of the second ink is $\gamma_{10}$ because the time when the second image is formed is a time directly after the second ink is ejected (i.e., directly after formation of an interface between the recording medium and the second ink). Here, when two liquids are adjacent to each other, the larger the difference between the dynamic surface tensions of the liquids is, the more easily the liquids tend to mix. In view of the foregoing, in the inkjet recording apparatus of the present disclosure, the first ink contained in the first image hardly mixes with the newly ejected second ink at the time when the second image is formed because the difference $\Delta$ between the dynamic surface tensions is small. From the above, the inkjet recording apparatus of the present disclosure can inhibit occurrence of blotting.

Furthermore, the inks included in the inkjet recording apparatus of the present disclosure each have a dynamic surface tension at a surface age of 10 milliseconds of at least 40.0 mN/m. As a result of the aforementioned dynamic surface tensions being comparatively high, the inks of the inkjet recording apparatus of the present disclosure form a stable meniscus on the ejection orifices when ejected from the line recording heads. As such, the inkjet recording apparatus of the present disclosure has excellent ink ejection stability. Furthermore, the inks of the inkjet recording apparatus of the present disclosure each contain a glycol ether compound and have a dynamic surface tension at a surface age of 10 milliseconds of at least 40.0 mN/m. This can reduce the difference $\Delta$ between the dynamic surface tensions.

The inkjet recording apparatus of the present disclosure is described below with reference to the accompanying drawing. Note that the drawing schematically illustrates elements of configuration in order to facilitate understanding. Properties such as the size and number of each element of configuration illustrated in the drawing may differ from actual properties in order to facilitate preparation of the drawings.

FIGURE is a diagram illustrating main components of an inkjet recording apparatus 100. As illustrated in FIGURE, the inkjet recording apparatus 100 mainly includes a conveyance section 1 and four line recording heads 11. The inkjet recording apparatus 100 further includes a sheet feed tray 2, a sheet feed roller 3, a sheet feed driven roller 4, a conveyor belt 5, a belt drive roller 6, a belt driven roller 7, an ejection roller 8, an ejection driven roller 9, and an exit tray 10. The conveyance belt 5, the belt drive roller 6, and the belt driven roller 7 constitute a part of the conveyance section 1. The sheet feed tray 2 is disposed at the left end of the inkjet recording apparatus 100 in FIGURE. The sheet feed tray 2 accommodates sheets P of recording paper (a recording medium). The sheet feed roller 3 and the sheet feed driven roller 4 are disposed at one end of the sheet feed tray 2. The sheet feed roller 3 sequentially picks up the accommodated sheets P one at a time, starting with the uppermost sheet P, and feeds it onto the conveyor belt 5. The sheet feed driven roller 4 is in press contact with the sheet feed roller 3 to be driven to rotate.

The conveyor belt 5 is disposed in a rotatable manner downstream of the sheet feed roller 3 and the sheet feed driven roller 4 in terms of a sheet conveyance direction (rightward in FIGURE). The conveyor belt 5 is wound between the belt drive roller 6 and the belt driven roller 7. The belt drive roller 6 is disposed downstream of the driven roller 7 in terms of the sheet conveyance direction. The belt drive roller 6 drives the conveyor belt 5. The belt driven roller 7 is disposed upstream of the drive roller 6 in terms of the sheet conveyance direction. The belt driven roller 7 rotates following the rotation of the belt drive roller 6 with the conveyor belt 5 therebetween. As a result of the belt drive roller 6 being driven to rotate in the clockwise direction in FIGURE, the sheet P is conveyed in a conveyance direction X indicated by an arrow in FIGURE.

Furthermore, the ejection roller 8 and the ejection driven roller 9 are disposed downstream of the conveyor belt 5 in terms of the sheet conveyance direction. The ejection roller 8 is driven to rotate in the clockwise direction in FIGURE and ejects the sheet P with an image formed thereon out of the apparatus housing. The ejection driven roller 9 is in press contact with the upper part of the ejection roller 8 to be driven to rotate. The exit tray 10 is disposed downstream of the ejection roller 8 and the ejection driven roller 9 in terms of the sheet conveyance direction. The sheet P ejected out of the apparatus housing is placed on the exit tray 10.

The four line recording heads 11 includes a first line recording head 11C, a second line recording head 11M, a third line recording head 11Y, and a fourth line recording head 11K. The first line recording head 11C, the second line recording head 11M, the third line recording head 11Y, and the fourth line recording head 11K are arranged above the conveyor belt 5 at substantially regular intervals in the stated order from upstream to downstream in terms of the conveyance direction X of the sheet P. The four line recording heads 11 are supported at a specific level which is a specific height from the upper surface of the conveyor belt 5. The four line recording heads 11 each record an image on the sheet P conveyed on the conveyor belt 5. The four line recording heads 11 each accommodate a corresponding one of four inks (a first ink, a second ink, a third ink, and a fourth ink) of mutually different colors (cyan, magenta, yellow, and black). The four line recording heads 11 perform ink ejection onto the sheet P in a specific order at the regular ejection intervals T. In the manner described above, a color image is formed on the sheet P.

The ejection intervals T of the four line recording heads 11 are at least 300 milliseconds and no greater than 530 milliseconds. Here, the ejection intervals each refer to a period from a time when a specific line recording head 11 (e.g., the first line recording head 11C) ejects a specific ink (e.g., the first ink) onto a specific area of a sheet P to a time when the next specific line recording head 11 (e.g., the second line recording head 11M) ejects a another specific ink (e.g., the second ink) onto the same area of the sheet P.

Each of the first to fourth inks contains a pigment, a water-soluble organic solvent, and water. The water-soluble organic solvent includes a glycol ether compound. Each of the first to fourth inks has a dynamic surface tension at a surface age of 10 milliseconds of at least 40.0 mN/m. The difference $\Delta$ between the dynamic surface tension of the first ink at a time when the ejection interval T has elapsed from ejection of the first ink onto the recording medium (i.e., from formation of an interface between the recording medium and the first ink) and the dynamic surface tension of the second ink at a surface age of 10 milliseconds is no greater than 3.0 mN/m. The difference $\Delta$ between the dynamic surface tension of the second ink at a time when the ejection interval T has elapsed from ejection of the second ink onto the recording medium (i.e., from formation of an interface between the recording medium and the second ink) and the dynamic surface tension of the third ink at a surface age of 10 milliseconds is no greater than 3.0 mN/m. The difference $\Delta$ between the dynamic surface tension of the third ink at a time when the ejection interval T has elapsed from ejection of the third ink onto the recording medium (i.e., from formation of an interface between the recording medium and the third ink) and the dynamic surface tension of the fourth ink at a surface age of 10 milliseconds is no greater than 3.0 mN/m.

One example of the inkjet recording apparatus of the present disclosure has been described so far with reference to FIGURE. However, the inkjet recording apparatus of the present disclosure is not limited to that illustrated in FIGURE.

An example of the inkjet recording apparatus 100 has been described that includes four line recording heads 11 corresponding to four inks with reference to FIGURE. However, the number of the line recording heads of the inkjet recording apparatus of the present disclosure is not limited particularly so long as it is 2 or more and can be 2 or more and 6 or less, for example. The number of the line recording heads of the inkjet recording apparatus of the present disclosure is preferably 4. Note that when the number of the line recording heads of the inkjet recording apparatus of the present disclosure is 3 or more, at least the difference $\Delta$ between the dynamic surface tension of the first ink and the dynamic surface tension of the second ink should meet the aforementioned conditions. For example, the difference $\Delta$ between the dynamic surface tension of the second ink and the dynamic surface tension of the third ink may not meet the aforementioned conditions.

Furthermore, the inkjet recording apparatus 100 ejects the four inks of the cyan ink, the magenta ink, the yellow ink, and the black ink in the stated order. However, the types, combination, and ejection order of the inks are not limited thereto.

It is preferable that the line recording heads further include a third line recording head that performs ink ejection next to the second line recording head. In this case, where the ink accommodated in the third line recording head is a third ink, the difference between the dynamic surface tension of the second ink at a time when the ejection interval T has elapsed from ejection of the second ink onto the recording medium and the dynamic surface tension of the third ink at a surface age of 10 milliseconds is preferably no greater than 3.0 mN/m.

Furthermore, it is preferable that the line recording heads further include a fourth line recording head that performs ink ejection next to the third line recording head. In this case, where the ink accommodated in the fourth line recording head is a fourth ink, the difference between the dynamic surface tension of the third ink at a time when the ejection interval T has elapsed from ejection of the third ink onto the recording medium and the dynamic surface tension of the fourth ink at a surface age of 10 milliseconds is preferably no greater than 3.0 mN/m.

In addition, when the number of the line recording heads is n (n: any natural number of at least 5) and the order in which the inks are to be ejected is 1, 2 . . . , (m−1), and m (m: any natural number of at least 5 and no greater than n), the difference between the dynamic surface tension of an ink ejected (m−1)-th at a time when the ejection interval T has elapsed from the (m−1)-th ink ejection onto the recording medium (i.e., from formation of an interface between the recording medium and the ink ejected (m−1)-th) and the dynamic surface tension of an ink ejected m-th at a surface age of 10 milliseconds is preferably no greater than 3.0 mN/m.

According to the present disclosure, occurrence of blotting can be inhibited by setting the difference between the dynamic surface tension of a (z−1)-th ink (z: any natural number of at least 2) at a time when the ejection interval T has elapsed from ejection of the (z−1)-th ink and the dynamic surface tension of a z-th ink at a surface age of 10 milliseconds to no greater than 3.0 mN/m. One reason thereof is that when different two inks are ejected to respective two adjacent area of a recording medium, the two ink adjacent to each other on the recording medium hardly mix with each other through reduction in difference between the dynamic surface tensions of the two inks as described above.

Furthermore, the inkjet recording apparatus of the present disclosure may be a multifunction peripheral having functions of a scanner, a copier, a printer, or a facsimile machine.

[Inks]

The inks used in the inkjet recording apparatus of the present disclosure are described below in detail. Each of the inks contains a pigment, a water-soluble organic solvent, and water. The water-soluble organic solvent includes a glycol ether compound. Preferably, the ink further contains a surfactant.

(Pigment)

The pigment in the ink constitutes pigment particles together with a pigment covering resin, for example. The pigment particles are each constituted by a core containing the pigment and the pigment covering resin covering the core. The pigment covering resin is present, for example, as a dispersion in a solvent. In terms of increasing color density, hue, or stability of the ink, the pigment particles have a number average primary particle diameter ($D_{50}$) of preferably at least 30 nm and no greater than 200 nm, and more preferably at least 70 nm and no greater than 130 nm.

Examples of the pigment include yellow pigments, orange pigments, red pigments, blue pigments, violet pigments, and black pigments. Examples of the yellow pigments include C.I. Pigment Yellow (74, 93, 95, 109, 110, 120, 128, 138, 139, 151, 154, 155, 173, 180, 185, or 193). Examples of the orange pigments include C.I. Pigment Orange (34, 36, 43, 61, 63, or 71). Examples of the red pigments include C.I. Pigment Red (122 or 202). Examples of the bule pigments include C.I. Pigment Blue (15, more specifically 15:3). Examples of the violet pigments include C.I. Pigment Violet (19, 23, or 33). Examples of the black pigments include C.I. Pigment Black (7).

As described previously, the inkjet recording apparatus of the present disclosure uses a plurality of inks. Usually, the inks contain pigments that are different in color. With the inks as above, the inkjet recording apparatus of the present disclosure can form color images.

The pigment has a percentage content in the ink of preferably at least 0.5% by mass and no greater than 10.0% by mass, and more preferably at least 1.5% by mass and no greater than 5.0% by mass. As a result of the percentage content of the pigment being set to at least 0.5% by mass, formation of images with desired image density can be facilitated in the inkjet recording apparatus of the present disclosure. As a result of the percentage content of the pigment being set to no greater than 10.0% by mass, fluidity of the pigment in the ink increases. This facilitate formation of image with desired image density in the inkjet recording apparatus of the present disclosure.

(Pigment Covering Resin)

The pigment covering resin is a resin soluble in the ink. A portion of the pigment covering resin is present for example on the surfaces of the pigment particles to increase dispersibility of the pigment particles. Another portion of the pigment covering resin is present in a dissolved state in the ink. The pigment covering resin is preferably acrylic resin. The acrylic resin is a polymer of at least one monomer of (meth)acrylic acid alkyl ester and (meth)acrylic acid.

The pigment covering resin has a percentage content in the ink of preferably at least 0.1% by mass and no greater than 5.0% by mass, and more preferably at least 0.5% by mass and no greater than 2.0% by mass.

(Water-Soluble Organic Solvent)

The water-soluble organic solvent functions as a solvent or dispersion medium of the ink together with the water. The water-soluble organic solvent includes a glycol ether compound.

(Glycol Ether Compound)

The glycol ether compound increases permeability of the ink to the recording medium and provides appropriate dynamic surface tension to the ink.

The glycol ether compound is a compound in which a hydroxyl group (—OH group) at one or both ends of an alkylene glycol compound has been substituted with a lower alkyl group. Examples of the glycol ether compound include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether, and tripropylene glycol monomethyl ether.

The glycol ether compound is preferably triethylene glycol monobutyl ether.

The glycol ether compound has a percentage content in the ink of preferably at least 3.0% by mass and no greater than 20.0% by mass, more preferably at least 5.0% and no greater than 20.0% by mass, and further preferably at least 5.0% by mass and no greater than 10.0% by mass.

The water-soluble organic solvent may further include an additional water-soluble organic solvent other than the glycol ether compound. Examples of the additional water-soluble organic solvent include glycol compounds, lactam compounds, nitrogen-containing compounds, acetate compounds, thiodiglycol, glycerin, and dimethyl sulfoxide.

Examples of the glycol compounds include ethylene glycol, 1,3-propendiol, propylene glycol, 1,2-pentanediol, 1,5-pentanediol, 1,2-octanediol, 1,8-octanediol, 3-methyl-1,3-butanediol, 3-methyl-1,5-pentanediol, diethylene glycol, triethylene glycol, and tetraethylene glycol.

Examples of the lactam compounds include 2-pyrrolidone and N-methyl-2-pyrrolidone.

Examples of the nitrogen-containing compounds include 1,3-dimethylimidazolidinone, formamide, and dimethyl formamide.

Examples of the acetate compounds include diethylene glycol monoethyl ether acetate.

The additional water-soluble organic solvent is preferably a glycol compound or a lactam compound, and more preferably propylene glycol or 2-pyrrolidone.

The additional water-soluble organic solvent has a percentage content in the ink of preferably at least 15.0% by mass and no greater than 60.0% by mass, and more preferably at least 35.0% by mass and no greater than 45.0% by mass.

The glycol compound has a percentage content in the ink of preferably at least 15.0% by mass and no greater than 55.0% by mass, and more preferably at least 35.0% by mass and no greater than 42.0% by mass.

The lactam compound has a percentage content in the ink of preferably at least 0.3% by mass and no greater than 5.0% by mass, and more preferably at least 1.0% by mass and no greater than 2.0% by mass.

(Water)

The water has a percentage content in the ink of preferably at least 20.0% by mass and no greater than 60.0% by mass, and more preferably at least 30.0% by mass and no greater than 50.0% by mass.

(Surfactant)

The surfactant increases wettability of the ink to the recording medium and compatibility of each component in the ink. The surfactant is preferably a nonionic surfactant.

Example of the nonionic surfactant include silicone surfactants, acetylenediols and ethylene oxide adducts of acetylenediols. Examples of the acetylenediols include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol.

The surfactant contained in the ink preferably has an HLB value of at least 11 and no greater than 16. This can facilitate preparation of the ink with a dynamic surface tension at a surface age of 10 milliseconds of at least 40.0 mN/m. Note that the HLB value is a value calculated by Griffin's method using a formula (HLB value=20×(sum of formula weights of hydrophilic parts)/(molecular weight) unless otherwise stated. The "HLB value" is a value indicating a degree of affinity of a surfactant with water or oil. A surfactant with an HLB value closer to 0 is more lipophilic. A surfactant with an HLB value closer to 20 is more hydrophilic.

The surfactant has a percentage content in the ink of preferably at least 0.1% by mass and no greater than 3.0% by mass, and more preferably at least 0.2% by mass and no greater than 1.0% by mass.

(Other Components)

The ink may further contain a known additive (specific examples include an anti-drying agent, an antioxidant, a viscosity modifier, a pH adjuster, an anti-mold agent, and a moisturizing agent) as necessary.

As described previously, the inkjet recording apparatus of the present disclosure uses a plurality of inks. Usually, the inks differ from each other in the type of the pigment they contain. However, the inks are preferably the same as each other in composition other than the type of the pigment. That is, it is preferable that the inks differ from each other only in the type of the pigment and are the same as each other in the percentage content of the pigment and the type and percentage content of each of the other components (specifically, the water-soluble organic solvent, the water, and any other optional components).

[Ink Production Method]

No particular limitations are placed on a production method of the ink so long as the pigment and the other components added as necessary can be uniformly mixed. An example of the production method of the ink is a method in which each component of the ink is stirred and mixed uniformly using a stirrer, followed by removal of foreign matter and coarse particles using a filter (e.g., a filter with a pore size of no greater than 5 µm).

When water is added in the production method of the ink, addition of ion exchange water is preferable.

Examples

The following describes examples of the present disclosure. However, the present disclosure is not limited to the following examples.

[Pigment Dispersion Preparation]

(Preparation of Cyan Pigment Dispersion)

A mixed liquid was obtained by mixing 15 parts by mass of a cyan pigment ("HELIOGEN (registered Japanese trademark) BLUE D 7088", product of BASF Japan Ltd., C.I. Pigment Blue 15:3), 10 parts by mass of a dispersion ("DISPERBYK (registered Japanese trademark) 190", product of BYK JAPAN KK., nonvolatile component: 40%, effective component: acrylic resin) containing a pigment covering resin, and 75 parts by mass of water followed by pre-dispersion of the resultant using a disperser. Next, dispersion treatment was carried out on the resultant mixed liquid using a bead mill ("DYNO MILL", product of Willy A. Bachofen AG) with a capacity of 0.6 L charged with 1800 g of zirconia beads with a diameter of 0.1 mm as a dispersion medium. Through the above, a cyan pigment dispersion (pigment concentration: 15% by mass) was obtained.

(Preparation of Magenta Pigment Dispersion)

A magenta pigment dispersion (pigment concentration: 15% by mass) was obtained according to the same method as that for preparing the cyan pigment dispersion in all aspects other than use of a magenta pigment ("CINQUASIA MAGENTA D 4550J", product of BASF Japan Ltd., C.I. Pigment Red 122) in place of the cyan pigment.

(Preparation of Yellow Pigment Dispersion)

A yellow pigment dispersion (pigment concentration: 15% by mass) was obtained according to the same method as that for preparing the cyan pigment dispersion in all aspects other than use of a yellow pigment ("FAST YEL- LOW 7413", product of SANYO COLOR WORKS, Ltd., C.I. Pigment Yellow 74) in place of the cyan pigment.
(Preparation of Black Pigment Dispersion)

A black pigment dispersion (pigment concentration: 15% by mass) was obtained according to the same method as that for preparing the cyan pigment dispersion in all aspects other than use of a black pigment ("PRINTEX (registered Japanese trademark) 85", product of Orion Engineered Carbons KK, carbon black) in place of the cyan pigment.

[Ink Preparation]

Components were added into a vessel so that the types and percentage contents thereof were as shown below in Tables 1 and 2. The vessel contents were stirred and uniformly mixed using a stirrer ("THREE-ONE MOTOR BL-600", product of Shinto Scientific Co., Ltd.) at a rotational speed of 400 rpm. The resultant mixed liquid was filtered using a filter with a pore sized of 5 μm in order to remove foreign matter and coarse particles from the mixed liquid. As a result, cyan inks (C-1) to (C-6), magenta inks (M-1) to (M-6), a yellow ink (Y-1), and a black ink (B-1) were obtained.

Details of the components in Tables 1 and 2 below are as follows.

BT: triethylene glycol monobutyl ether (product of NIPPON NYUKAZAI CO., LTD.)
Propylene glycol: product of Dupont Specialty Products
2-Pyrrolidone: product of Mitsubishi Chemical Corporation
Surfactant (S-1): nonionic surfactant ("OLFINE (registered Japanese trademark) E1010", product of Nissin Chemical Industry Co., Ltd., contents: ethylene oxide adduct of acetylenediol, effective component concentration: 100% by mass, HLB value: 13.5±0.5)
Surfactant (S-2): nonionic surfactant ("SURFYNOL (registered Japanese trademark) 420", product of Nissin Chemical Industry Co., Ltd., contents: ethylene oxide adduct of acetylene glycol, effective component concentration: 100% by mass, HLB value: 4)
Surfactant (S-3): nonionic surfactant ("SURFYNOL (registered Japanese trademark) 440", product of Nissin Chemical Industry Co., Ltd., contents: ethylene oxide adduct of acetylene glycol, effective component concentration: 100% by mass, HLB value: 8)

TABLE 1

| | Ink | | C-1 | C-2 | C-3 | C-4 | C-5 | C-6 |
|---|---|---|---|---|---|---|---|---|
| Composition [% by mass] | Pigment dispersion | Cyan | 26.7 | 26.7 | 26.7 | 26.7 | 26.7 | 26.7 |
| | | Magenta | — | — | — | — | — | — |
| | | Yellow | — | — | — | — | — | — |
| | | Black | — | — | — | — | — | — |
| | BT | | 8.0 | 8.0 | 8.0 | 8.0 | 8.0 | 8.0 |
| | Propylene glycol | | 39.7 | 39.2 | 39.7 | 39.2 | 39.7 | 39.2 |
| | 2-Pyrrolidone | | 1.5 | 1.5 | 1.5 | 1.5 | 1.5 | 1.5 |
| | Surfactant | S-1 | 0.5 | 1.0 | — | — | — | — |
| | | S-2 | — | — | 0.5 | 1.0 | — | — |
| | | S-3 | — | — | — | — | 0.5 | 1.0 |
| | Ion exchange water | | 23.6 | 23.6 | 23.6 | 23.6 | 23.6 | 23.6 |

TABLE 2

| | Ink | | M-1 | M-2 | M-3 | M-4 | M-5 | M-6 | Y-1 | B-1 |
|---|---|---|---|---|---|---|---|---|---|---|
| Composition [% by mass] | Pigment dispersion | Cyan | — | — | — | — | — | — | — | — |
| | | Magenta | 26.7 | 26.7 | 26.7 | 26.7 | 26.7 | 26.7 | — | — |
| | | Yellow | — | — | — | — | — | — | 26.7 | — |
| | | Black | — | — | — | — | — | — | — | 26.7 |
| | BT | | 8.0 | 8.0 | 8.0 | 8.0 | 8.0 | 8.0 | 8.0 | 8.0 |
| | Propylene glycol | | 39.7 | 39.2 | 39.7 | 39.2 | 39.7 | 39.2 | 39.7 | 39.7 |
| | 2-Pyrrolidone | | 1.5 | 1.5 | 1.5 | 1.5 | 1.5 | 1.5 | 1.5 | 1.5 |
| | Surfactant | S-1 | 0.5 | 1.0 | — | — | — | — | 0.5 | 0.5 |
| | | S-2 | — | — | 0.5 | 1.0 | — | — | — | — |
| | | S-3 | — | — | — | — | 0.5 | 1.0 | — | — |
| | Ion exchange water | | 23.6 | 23.6 | 23.6 | 23.6 | 23.6 | 23.6 | 23.6 | 23.6 |

<Inkjet Recording Apparatus>

An inkjet recording apparatus (prototype evaluation apparatus produced by KYOCERA Document Solutions Japan Inc.) including a conveyor belt and two line recording heads was prepared as an inkjet recording apparatus for evaluation use. The inkjet recording apparatus is variable in printing speed (conveyance speed of the conveyor belt). The two line recording heads were arranged in parallel to each other in terms of the conveyance direction. The distance (inter-head distance) between the two line recording heads was 250 mm. Of the two line recording heads, a line recording head located upstream in terms of the conveyance direction of the recording medium and that performs ink ejection onto a recording medium first was taken as a "first line recording head". Of the two line recording heads, a line recording head located downstream of the first line recording head in terms of the conveyance direction of the recording medium and that performs ink ejection onto the recording medium next to the first line recording head was taken as a "second line recording head". The amount of ink ejected from each of the two line recording heads was set to 4 pL.

One of the yellow ink (Y-1) and the magenta inks (M-1) to (M-6) was loaded in the first line recording head as the first ink. One of the black ink (B-1) and the cyan inks (C-1) to (C-6) was loaded in the second line recording head. The type and ejection order of the inks used are shown below in Table 3. Thus, inkjet recording apparatuses of Examples 1 to 3 and Comparative Examples 1 to 4 were prepared.

[Dynamic Surface Tension Measurement]

With respect to each of the inks, the dynamic surface tension $\gamma_{10}$ at a surface age of 10 milliseconds, the dynamic surface tension $\gamma_{314}$ at a surface age of 314 milliseconds, and the dynamic surface tension $\gamma_{500}$ at a surface age of 500 milliseconds were measured by the maximum bubble pressure method using a dynamic surface tension measuring device ("BP-100", product of KRUSS). The measurement temperature was 25° C. The measurement results are shown below in Table 3.

TABLE 3

|  | First ink | | | | Second ink | | | |
| --- | --- | --- | --- | --- | --- | --- | --- | --- |
|  | Type | $\gamma_{10}$ | $\gamma_{314}$ | $\gamma_{500}$ | Type | $\gamma_{10}$ | $\gamma_{314}$ | $\gamma_{500}$ |
| Example 1 | M-1 | 40.5 | 38.9 | 38.7 | C-1 | 40.8 | 39.0 | 38.9 |
| Example 2 | M-2 | 40.1 | 37.6 | 37.5 | C-2 | 40.4 | 37.8 | 37.6 |
| Comparative Example 1 | M-3 | 42.1 | 36.8 | 36.6 | C-3 | 42.3 | 37.3 | 36.8 |
| Comparative Example 2 | M-4 | 39.1 | 34.3 | 34.0 | C-4 | 39.2 | 34.6 | 34.3 |
| Comparative Example 3 | M-5 | 36.5 | 34.6 | 34.4 | C-5 | 36.7 | 34.7 | 34.6 |
| Comparative Example 4 | M-6 | 37.7 | 34.6 | 34.5 | C-6 | 37.8 | 34.8 | 34.6 |
| Example 3 | Y-1 | 40.3 | 38.5 | 38.1 | B-1 | 40.6 | 38.8 | 38.5 |

<Evaluation>

Ejection stability and occurrence or non-occurrence of blotting were evaluated for the inkjet recording apparatuses of Examples 1 to 3 and Comparative Examples 1 to 4 by the following methods. In evaluation, coated paper ("OK TopKote+", product of Oji Paper Co., Ltd.) was used as a recording medium. The evaluation results are shown below in Table 4.

[Blotting]

Using any of the inkjet recording apparatuses of Examples 1 to 3 and Comparative Examples 1 to 4, a first evaluation image was formed on a sheet of the recording medium. In the formation of the first evaluation image, the printing speed (conveyance speed of the conveyor belt) of the inkjet recording apparatus was set to 796 mm/sec. In the formation of the first evaluation image, the first ink was ejected onto a sheet of the recording medium first using the first line recording head to form a first horizontal line perpendicular to the conveyance direction. The formation of the first horizontal line was set so that the line width of the first horizontal line was constituted by 4 dots. Next, the second ink was ejected onto the sheet of the recording medium using the second line recording head to form a second horizontal line perpendicular to the conveyance direction. The formation of the second horizontal line was set so that the line width of the second horizontal line was constituted by 4 dots. The formation of the first horizontal line and the formation of the second horizontal line are repeated alternately to form the first evaluation image including a stripe image of the first horizontal lines and a stripe image of the second horizontal image. After the formation of the first evaluation image, the recording medium was allowed to naturally dry sufficiently. The first horizontal line and the second horizontal line are formed adjacent to each other. That is, in the first evaluation image, the first horizontal line formed with the first ink and the second horizontal line formed with the second ink were adjacent to each other.

A second evaluation image was formed according to the same method as that for forming the first evaluation image in all aspects other than that the printing speed (conveyance speed of the conveyor belt) was set to 500 mm/sec in each of the inkjet recording apparatuses of Examples 1 to 3 and Comparative Examples 1 to 4.

In the first evaluation image formation and the second evaluation image formation, the ejection interval T in each of the inkjet recording apparatuses was obtained as follows. In each of the inkjet recording apparatuses, the inter-head distance between the two line recording heads was 250 mm as described previously. In the first evaluation image formation, a value (314 milliseconds) obtained by dividing the inter-head distance (250 mm) of the inkjet recording apparatus by the printing speed (796 mm/sec) was taken as the ejection interval T in the inkjet recording apparatus. In the second evaluation image formation, a value (500 milliseconds) obtained by dividing the inter-head distance (250 mm) of the inkjet recording apparatus by the printing speed (500 mm/sec) was taken as the ejection interval T in the inkjet recording apparatus. Therefore, the dynamic surface tension $\gamma_T$ of the first ink at a time when the ejection interval T has elapsed from ejection of the first ink onto the recording medium is $\gamma_T = \gamma_{314}$ in formation of the first evaluation image and $\gamma_T = \gamma_{500}$ in formation of the second evaluation image.

The first evaluation images and the second evaluation images were visually observed to confirm whether or not blotting had occurred resulting from mixing of the two colors at the boundaries between the horizontal lines formed with the first ink and the horizontal lines formed with the second ink. Blotting was evaluated according to the following criteria.

(Criteria of Blotting)

A (good): No blotting has occurred in the boundaries.

B (poor): The first ink and the second ink have mixed with each other to cause blotting in the boundaries.

[Ejection Stability]

Using any of the inkjet recording apparatuses of Examples 1 to 3 and Comparative Examples 1 to 4, ink ejection onto sheets of the recording medium was carried out continuously for 30 minutes by all of the nozzles of both the first line recording head and the second line recording head (continuous ejection). In the continuous ejection, the printing speed (conveyance speed of the conveyor belt) of the inkjet recording apparatus was set to 796 mm/sec. Directly after the continuous ejection, a solid image of a mixed color was formed by overlying the first ink with the second ink using the inkjet recording apparatus.

The solid image was visually observed to check the presence or absence of image defect resulting from ink ejection failure. Ejection stability was evaluated according to the following criteria.

(Criteria of Ejection Stability)

A (good): Image defect resulting from ink ejection failure has not been caused.

B (poor): Image defect resulting from ink ejection failure has been caused.

TABLE 4

|  | Blotting | | | | |
|---|---|---|---|---|---|
|  | First evaluation image (Printing speed: 796 mm/sec) | | Second evaluation image (Printing speed: 500 mm/sec) | | Ejection |
|  | Δ [mN/m] | Rating | Δ [mN/m] | Rating | stability |
| Example 1 | 1.9 | A | 2.1 | A | A |
| Example 2 | 2.7 | A | 2.9 | A | A |
| Comparative Example 1 | 5.4 | B | 5.7 | B | A |
| Comparative Example 2 | 4.9 | B | 5.2 | B | B |
| Comparative Example 3 | 2.1 | A | 2.3 | A | B |
| Comparative Example 4 | 3.2 | B | 3.3 | B | B |
| Example 3 | 2.1 | A | 2.5 | A | A |

Each of the inkjet recording apparatuses of Examples 1 to 3 included two or more line recording heads and inks each accommodated in a corresponding one of the line recording heads. Ejection onto the recording medium was performed by the line recording heads in a specific order at a regular ejection interval T. The ejection interval T was at least 300 milliseconds and no greater than 530 milliseconds. The line recording heads included a first line recording head that performs ink ejection onto a recording medium first and a second line recording head that performs ink ejection onto the recording medium next to the first line recording head. Each of the inks contained a pigment, a water-soluble organic solvent, and water. The water-soluble organic solvent included a glycol ether compound. Each of the inks had a dynamic surface tension at a surface age of 10 milliseconds of at least 40.0 mN/m. Where one of the inks accommodated in the first line recording head was the first ink and another one of the inks accommodated in the second line recording head was the second ink, a difference between the dynamic surface tension of the first ink at a time when the ejection interval T had elapsed from ejection of the first ink onto the recording medium and the dynamic surface tension of the second ink at a surface age of 10 milliseconds was no greater than 3.0 mN/m. The inkjet recording apparatuses of Examples 1 to 3 had excellent ink ejection stability and inhibited occurrence of blotting.

By contrast, the inkjet recording apparatuses of Comparative Examples 1 to 4 did not have the above features. Specifically, with respect to the first ink and the second ink in each of the inkjet recording apparatuses of Comparative Examples 1, 2, and 4, the difference Δ between the dynamic surface tension of the first ink at the time when the ejection interval T had elapsed from ejection of the first ink onto the recording medium and the dynamic surface tension of the second ink at a surface age of 10 milliseconds was greater than 3.0 mN/m. That is, in a case with any of the inkjet recording apparatuses of Comparative Examples 1, 2, and 4, the first ink and the second ink mixed with each other at the time when the second ink was ejected because the difference in the dynamic surface tension between the previously ejected first ink and the second ink was large. As a result, the inkjet recording apparatuses of Comparative Examples 1, 2, and 4 did not inhibit occurrence of blotting.

Furthermore, the dynamic surface tension of each of the first ink and the second ink at a surface age of 10 milliseconds was less than 40.0 mN/m in each of the inkjet recording apparatuses of Comparative Examples 2 to 4. As a result, the first ink and the second ink in each of the inkjet recording apparatuses of Comparative Examples 2 to 4 did not stably form the meniscus, resulting in poor ejection stability.

What is claimed is:

1. An inkjet recording apparatus comprising:
   two or more line recording heads; and
   inks each accommodated in a corresponding one of the line recording heads, wherein
   the line recording heads perform ink ejection onto a recording medium in a specific order at a regular ejection interval T,
   the ejection interval T is at least 300 milliseconds and no greater than 530 milliseconds,
   the line recording heads include at least a first line recording head that performs ink ejection onto the recording medium first and a second line recording head that performs ink ejection onto the recording medium next to the first line recording head,
   each of the inks contains a pigment, a water-soluble organic solvent, and water,
   the water-soluble organic solvent includes a glycol ether compound,
   each of the ink has a dynamic surface tension at a surface age of 10 milliseconds of at least 40.0 mN/m, and
   where one of the inks that is accommodated in the first line recording head is a first ink and another one of the inks that is accommodated in the second line recording head is a second ink, a difference between a dynamic surface tension of the first ink at a time when the ejection interval T has elapsed from ejection of the first ink onto the recording medium and a dynamic surface tension of the second ink at a surface age of 10 milliseconds is no greater than 3.0 mN/m, and
   the glycol ether compound has a percentage content in each of the inks of at least 5.0% by mass and no greater than 20.0% by mass.

2. The inkjet recording apparatus according to claim 1, wherein
   the line recording heads further include a third line recording head that performs ink ejection onto the recording medium next to the second line recording head, and
   where one of the inks that is accommodated in the third line recording head is a third ink, a difference between a dynamic surface tension of the second ink at a time when the ejection interval T has elapsed from ejection of the second ink onto the recording medium and a dynamic surface tension of the third ink at a surface age of 10 milliseconds is no greater than 3.0 mN/m.

3. The inkjet recording apparatus according to claim 2, wherein
the line recording heads further include a fourth line recording head that performs ink ejection onto the recording medium next to the third line recording head, and
where one of the inks that is accommodated in the fourth line recording head is a fourth ink, a difference between a dynamic surface tension of the third ink at a time when the ejection interval T has elapsed from ejection of the third ink onto the recording medium and a dynamic surface tension of the fourth ink at a surface age of 10 milliseconds is no greater than 3.0 mN/m.

4. The inkjet recording apparatus according to claim 3, wherein
the line recording heads include n line recording heads (n is any natural number of at least 5), and
a difference between a dynamic surface tension of a (m−1)-th ink (m is any natural number of at least 5 and no greater than n) at a time when the ejection interval T has elapsed from ejection of the (m−1)-th ink onto the recording medium and a dynamic surface tension of an m-th ink at a surface age of 10 milliseconds is no greater than 3.0 mN/m.

* * * * *